United States Patent
Nakayama

(10) Patent No.: US 10,746,709 B2
(45) Date of Patent: Aug. 18, 2020

(54) CHROMATOGRAPH DEVICE

(71) Applicant: Shimadzu Corporation, Kyoto (JP)

(72) Inventor: Daisuke Nakayama, Kyoto (JP)

(73) Assignee: Shimadzu Corporation, Kyoto (JP)

(*) Notice: Subject to any disclaimer, the term of this patent is extended or adjusted under 35 U.S.C. 154(b) by 188 days.

(21) Appl. No.: 16/081,085

(22) PCT Filed: Jul. 6, 2016

(86) PCT No.: PCT/JP2016/070026
§ 371 (c)(1),
(2) Date: Aug. 30, 2018

(87) PCT Pub. No.: WO2017/149794
PCT Pub. Date: Sep. 8, 2017

(65) Prior Publication Data
US 2019/0017976 A1   Jan. 17, 2019

(30) Foreign Application Priority Data
Mar. 1, 2016   (JP) ................. 2016-038618

(51) Int. Cl.
*G01N 30/86*   (2006.01)
*H01J 49/00*   (2006.01)
(Continued)

(52) U.S. Cl.
CPC ............. *G01N 30/72* (2013.01); *G01N 30/74* (2013.01); *G01N 30/8651* (2013.01);
(Continued)

(58) Field of Classification Search
CPC ............... G01N 30/72; G01N 30/8693; G01N 30/8668; G01N 30/8651; G01N 30/74; H01J 49/0009; H01J 49/004
See application file for complete search history.

(56) References Cited

U.S. PATENT DOCUMENTS

2008/0110232 A1   5/2008   Miyagawa
2013/0306857 A1*  11/2013  Yamaguchi ........... H01J 49/022
                                                           250/282
(Continued)

FOREIGN PATENT DOCUMENTS

JP   61-128165 A   6/1986

OTHER PUBLICATIONS

Z. Hao, B. Xiao, N. Weng, "Impact of column temperature and mobile phase components on selectivity of hydrophilic interaction chromatography", May 23, 2008, Journal of separation science, vol. 31, Issue 9 (Year: 2008).*

(Continued)

*Primary Examiner* — Herbert K Roberts
*Assistant Examiner* — John M Royston
(74) *Attorney, Agent, or Firm* — Maier & Maier, PLLC

(57) ABSTRACT

A chromatograph device capable of correct measurement even if the retention times of target components change. This chromatograph device is provided with: a storage unit for storing measurement parameters for a plurality of target components, measurement conditions including measurement parameter switching times for each of two target components eluted in succession, and formulas for determining the switching times from predetermined retention times for the target components; a measurement data accumulation unit; a preceding-measurement-data determination unit for determining, at the time of sample measurement, whether there is preceding measurement data for the same column type, mobile phase type, and flow velocity; and a measurement execution unit for carrying out measurement on the basis of the measurement conditions if there is no preceding measurement data.

3 Claims, 3 Drawing Sheets

(51) Int. Cl.
*G01N 30/72* (2006.01)
*G01N 30/74* (2006.01)

(52) U.S. Cl.
CPC ..... *G01N 30/8668* (2013.01); *G01N 30/8693* (2013.01); *H01J 49/0009* (2013.01); *H01J 49/004* (2013.01)

(56) References Cited

U.S. PATENT DOCUMENTS

2016/0025692 A1* 1/2016 Satake ............... G01N 27/624
                                                    73/61.55
2016/0274073 A1* 9/2016 Hakeem ............. G01N 33/2829

OTHER PUBLICATIONS

Translation of Written Opinion dated Oct. 11, 2016 of corresponding application No. PCT/JP2016/070026; 4 pgs.
International Preliminary Report on Patentability dated Sep. 4, 2018 of corresponding application No. PCT/JP2016/070026; 5 pgs.
International Search Report and Written Opinion dated Oct. 11, 2016 of corresponding application No. PCT/JP2016/070026; 5 pgs.
Extended European Search Report dated Oct. 2, 2019, in corresponding European patent application No. 16892633.5; 12 pages.

* cited by examiner

FIG.2A

| SAMPLE CLASSIFICATION | COLUMN | MOBILE PHASE | | TARGET COMPONENT | MRM TRANSITION | | CE VALUE |
|---|---|---|---|---|---|---|---|
| | | TYPE | FLOW VELOCITY | | PRECURSOR | PRODUCT | |
| FOOD 1 | COLUMN A | MOBILE PHASE a | SPECIFIED VALUE 1 | COMPONENT A | A1 | a1 | SPECIFIED VALUE |
| | | | | COMPONENT B | B1 | b1 | SPECIFIED VALUE |
| | | | | COMPONENT C | C1 | c1 | SPECIFIED VALUE |
| | | | | COMPONENT D | D1 | d1 | SPECIFIED VALUE |
| FOOD 2 | COLUMN B | MOBILE PHASE a | SPECIFIED VALUE 2 | COMPONENT A | A1 | a1 | SPECIFIED VALUE |
| | | | | COMPONENT B | B1 | b2 | SPECIFIED VALUE |
| | | | | COMPONENT C | C1 | c1 | SPECIFIED VALUE |
| | | | | COMPONENT E | E1 | e1 | SPECIFIED VALUE |
| | | | | COMPONENT F | F1 | f1 | SPECIFIED VALUE |
| FOOD 3 | COLUMN A | MOBILE PHASE a | SPECIFIED VALUE 1 | COMPONENT A | A1 | a1 | SPECIFIED VALUE |
| | | | | COMPONENT B | B1 | b1 | SPECIFIED VALUE |
| | | | | COMPONENT C | C1 | c1 | SPECIFIED VALUE |
| | | | | COMPONENT D | D1 | d1 | SPECIFIED VALUE |

FIG.2B

| SAMPLE CLASSIFICATION | SWITCHING COMPONENT | SWITCHING TIME | |
|---|---|---|---|
| | | SPECIFIED VALUE | FORMULA |
| FOOD 1 | COMPONENT A→B | 3.0min. | ta+0.5(tb-ta) |
| | COMPONENT B→C | 5.0min. | tb+0.3(tc-tb) |
| | COMPONENT C→D | 8.0min. | tc+0.5(td-tc) |
| FOOD 2 | COMPONENT A→B | 2.5min. | ta+0.5(tb-ta) |
| | COMPONENT B→C | 4.0min. | tb+0.3(tc-tb) |
| | COMPONENT C→E | 6.0min. | tc+0.2(tf-tc) |
| | COMPONENT E→F | 9.0min. | tc+0.7(tf-tc) |
| FOOD 3 | COMPONENT A→B | 3.0min. | 1.5ta |
| | COMPONENT B→C | 5.0min. | 2.5ta |
| | COMPONENT C→D | 8.0min. | 4.0ta |

CHROMATOGRAPH DEVICE

FIELD

The present invention relates to a chromatograph device that temporally separates and measures a plurality of components contained in a sample. More particularly, the present invention relates to a chromatograph device that can be suitably used for quantifying known components contained in a sample.

BACKGROUND

In a chromatograph device such as a liquid chromatograph device and a gas chromatograph device, a plurality of components contained in a sample are temporally separated in a column and sequentially detected by a detector such as a mass spectrometer and an absorbance detector. A chromatograph device using a mass spectrometer as a detector is called a chromatograph mass spectrometry device. In a chromatograph mass spectrometry device, components separated in a column and eluted along with a mobile phase are sequentially ionized and mass-separated, and only ions derived from components in the sample are detected.

The mass separation is broadly divided into two modes, one being a selected ion monitoring (SIM) mode in which only ions with a specific mass-to-charge ratio are allowed to pass through a mass separation section and the other being a scan mode in which the mass-to-charge ratio of ions allowed to pass through the mass separation section is scanned. In the SIM mode, ions having a specific mass-to-charge ratio can be measured for a longtime, and thus the sensitivity and precision of the ion detection are high. The scan mode, in the meantime, is characterized in that ions with a mass-to-charge ratio within a scanning range can be exhaustively measured. Accordingly, the SIM mode is used for component measurement when the mass-to-charge ratio of generated ions is known, and the scan mode is used otherwise.

The chromatograph mass spectrometry device is used for quantification of a plurality of known components (hereinafter, referred to as "target components") such as measurement of pesticide residues contained in foods such as agricultural crops. The SIM mode is used in this measurement as described above, and thus the measurement conditions thereof include a mass-to-charge ratio for detecting each target component. In general, ions generated from different components have different mass-to-charge ratios, and thus different mass-to-charge ratios are normally associated with the plurality of target components. In this manner, mass-to-charge ratios are used as measurement parameters in the chromatograph mass spectrometry device.

After mass-to-charge ratios are associated for every target component, a sample is introduced into the chromatograph mass spectrometry device, and (ions generated from) the target component is measured with the mass-to-charge ratio (measurement parameter) switched before the timing at which each target component begins to elute from the column. The timing (switching time) at which the measurement parameter is switched can be determined by, for example, using the intermediate timing between the retention times of two target components eluted in succession from the column (times corresponding to peak tops of a chromatogram) as the switching time for the measurement parameters of the two components on the basis of the retention time of each target component acquired by, for example, (ions generated from) a standard sample being measured under a condition in which the column type, the mobile phase type, and the mobile phase flow velocity are the same as during actual sample measurement.

Likewise, in a chromatograph device provided with an absorptiometer as a detector, a specific wavelength is associated with each target component as a measurement parameter and the wavelength (measurement parameter) is switched between the retention times for two target components eluted in succession (for example, Patent Document 1).

Patent Document 1: JP-A-61-128165

SUMMARY

Usually, multiple samples (for example, hundreds of samples) are continuously measured in the above-described food pesticide residue measurement. In such a case, the state of the stationary phase inside the column may change during that period, the retention power of the stationary phase of the column may gradually change from the initiation of the measurement, and then the retention time may change little by little even for the same component. In addition, as the chromatograph device is repeatedly used, the flow velocity of the mobile phase may change from the flow velocity at the beginning of the use due to aged deterioration of a mobile phase-feeding feed pump or the like, and then the retention time may change little by little even for the same component. Since the retention parameter switching time is determined in advance based on the retention time acquired by standard sample measurement as described above, when the target component retention time changes, the next target component may be eluted from the column before measurement parameter switching or the previous target component may be eluted from the column after switching to the measurement parameter of the target component to be eluted next, and then a problem arises in the form of incorrect target component measurement.

Although quantitative target component analysis has been described as an example here, the same problem also arises when a plurality of known target components contained in a sample are temporally separated and measured and each component is separated into a sample container by flow path switching based on the timing thereof.

An object of the present invention is to provide a chromatograph device with which a target component can be correctly measured at all times even if the retention time of the target component changes from a pre-assumed retention time due to a change in the state of each device part.

The present invention made to solve the above problems relates to a chromatograph device separating and measuring a plurality of components contained in a sample in terms of time, the chromatograph device including a) a storage unit for storing measurement parameters respectively associated with a plurality of target components assumed to be contained in a measurement target sample, measurement conditions including switching times as timings for switching the measurement parameters for each of two target components eluted in succession from a column, and formulas for determining the switching times from predetermined retention times for one or a plurality of target components, b) a measurement data accumulation unit for accumulating data acquired by measurement using the chromatograph device along with information relating to a column type, a mobile phase type, and a mobile phase flow velocity in the measurement, c) a preceding-measurement-data determination unit for determining, at the time of measurement target sample measurement, whether there is preceding measurement data in the measurement data accumulation unit, the preceding measurement data being data obtained from measurement of the one or plurality of target components in measurement sharing the same column type, mobile phase type, and mobile phase flow velocity as the measurement, and d) a measurement execution unit for carrying out measurement of the measurement target sample on the basis of the measurement conditions if there is no preceding measurement data and, if there is preceding measurement data, determining the retention times of the one or plurality of target components on the basis of the most recent preceding measurement data, determining updated switching times as new switching times on the basis of the retention times and formulas, and carrying out measurement of the measurement target sample with the switching times included in the measurement conditions changed to the updated switching times.

In the chromatograph device according to the present invention, the storage unit stores not only measurement parameters for measuring a plurality of target components contained in samples and measurement conditions including switching times as timings for switching the measurement parameters of two target components eluted in succession from a column but also formulas for determining the switching times by using as parameters predetermined retention times for one or a plurality of target components. At the time of sample measurement, it is determined whether there is preceding measurement data obtained by measurement of the same component in measurement sharing the same column type, mobile phase type, and mobile phase flow velocity as the measurement (typically, every measurement condition affecting the retention time being identical). If there is preceding measurement data, sample measurement is performed with the measurement parameter switching time updated from the formula and the most recent preceding measurement data.

In the related art, the measurement parameter switching time is determined in advance based on a standard sample measurement result and so on and no change in target component retention time is assumed. Accordingly, the related art is problematic in that target component measurement cannot be correct in the event of a change in target component retention time. In that case, standard sample measurement and retention time determination should be redone, and then actual sample measurement should be redone. In the chromatograph device according to the present invention, in contrast, the target component retention time is determined from the most recent preceding measurement data and the measurement parameter switching time is updated based thereon, and thus correct target component measurement can be carried out by means of an appropriate switching time reflecting the states of a column, a feed pump, and so on.

The retention times used in the formulas for determining the (updated) switching times of the measurement parameters of two target components eluted in succession from a column may be the retention times of the two target components or one or both thereof may be the retention time of a target component other than the two target components. In the former case, the switching time can be updated with a more accurate change in retention time reflected. In the latter case, every measurement parameter switching time can be determined by means of, for example, the retention times of two target components. It is also possible to use only one target component retention time as the retention time used in the formula for measurement parameter switching time determination and determine the switching time by multiplying the retention time by a predetermined coefficient.

With the chromatograph device according to the present invention, a target component can be correctly measured at all times even if the retention time of the target component changes from a pre-assumed retention time due to a change in the state of each device part.

BRIEF DESCRIPTION OF THE DRAWINGS

FIG. 2A is an example of the measurement parameters.

FIG. 2B is an example of the switching times of the measurement parameters.

DETAILED DESCRIPTION

Mode for Carrying Out the Invention

Figure 1:
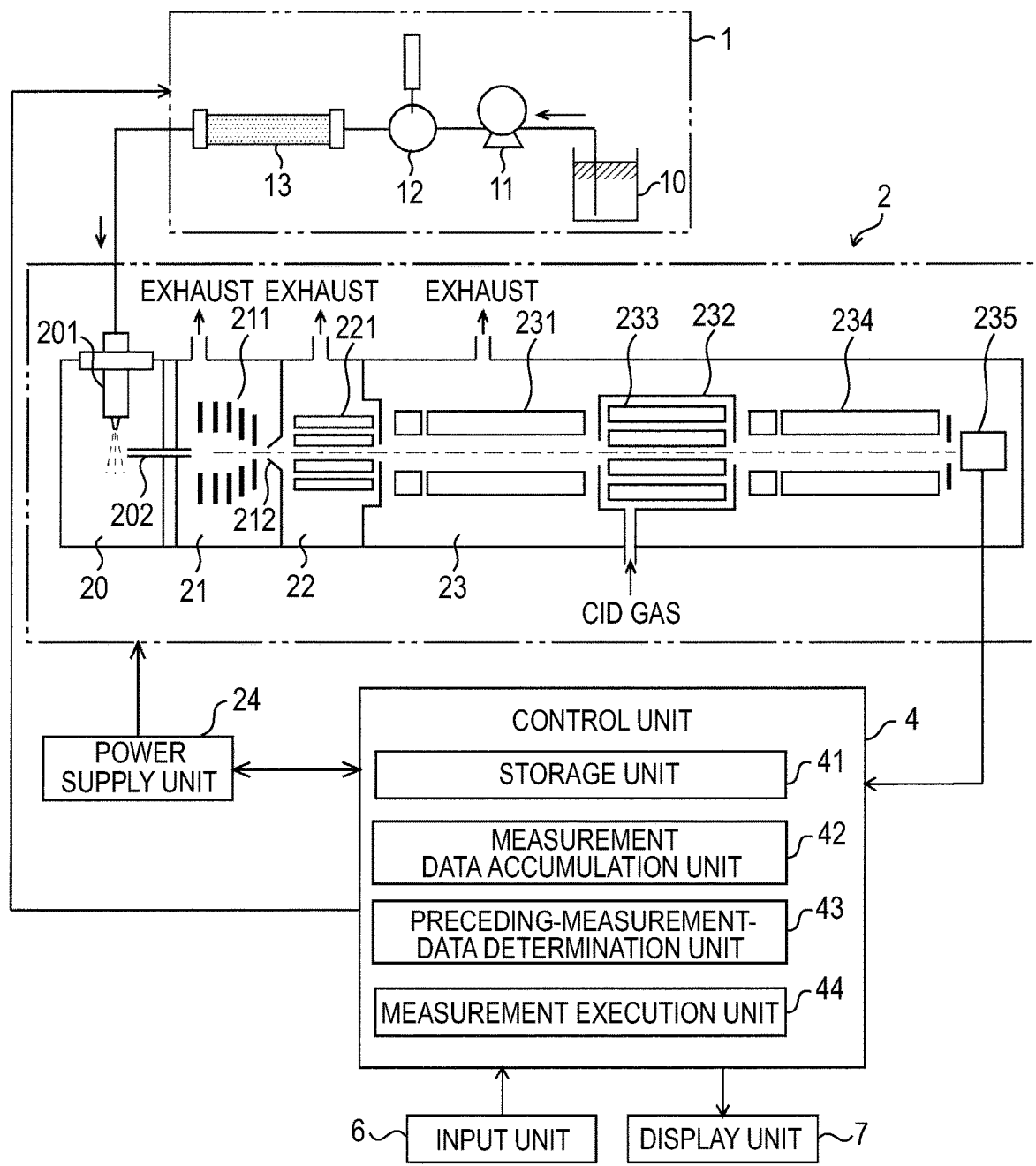
FIG. 1 is a configuration diagram illustrating main parts of a liquid chromatograph mass spectrometry device as an example of a chromatograph device according to the present invention.

Hereinafter, a liquid chromatograph mass spectrometry device as an example of a chromatograph device according to the present invention will be described with reference to accompanying drawings. FIG. 1 is a configuration diagram of main parts of the liquid chromatograph mass spectrometry device according to this example.

The liquid chromatograph mass spectrometry device according to this example is configured to include a liquid chromatograph unit 1, a mass spectrometry unit 2, and a control unit 4 controlling operations of the liquid chromatograph unit 1 and the mass spectrometry unit 2.

In the liquid chromatograph mass spectrometry device according to this example, the liquid chromatograph unit 1 is provided with a mobile phase container 10 in which a mobile phase is stored, a pump 11 suctioning the mobile phase and feeding the mobile phase at a constant flow rate, an injector 12 injecting a predetermined amount of sample liquid prepared in advance into the mobile phase, and a column 13 separating various compounds contained in the sample liquid in a time direction.

The mass spectrometry unit 2 has the configuration of a multistage differential exhaust system in which first and second intermediate vacuum chambers 21 and 22 with a degree of vacuum increasing in stages are provided between an ionization chamber 20 that is substantially at atmospheric pressure and a high-vacuum analysis chamber 23 evacuated by a vacuum pump (not illustrated). An electrospray ionization probe (ESI probe) 201 is disposed in the ionization chamber 20, and the ESI probe 201 sprays a sample solution while applying electric charge to the sample solution. The ionization chamber 20 and the first intermediate vacuum chamber 21 in the latter stage communicate with each other through a small-diameter heating capillary 202. The first intermediate vacuum chamber 21 and the second intermediate vacuum chamber 22 are separated by a skimmer 212 having a small hole in the top portion thereof. Ion guides 211 and 221 are disposed in the first intermediate vacuum chamber 21 and the second intermediate vacuum chamber 22, respectively. The ion guides 211 and 221 are to transport ions to the latter stage while converging the ions. Disposed in the analysis chamber 23 are a former-stage quadrupole mass filter (Q1) 231, a collision cell 232 in which a multipole ion guide (q2) 233 is disposed, a latter-stage quadrupole mass filter (Q3) 234, and an ion detector 235.

CID gas such as argon and nitrogen is continuously or intermittently supplied into the collision cell 232 if necessary. A power supply unit 24 applies a predetermined voltage to each of, for example, the ESI probe 201, the ion guides 211, 221, and 233, and the quadrupole mass filters 231 and 234. Each of the quadrupole mass filters 231 and 234 has a pre-rod electrode for correcting the disturbance of the electric field at the entrance end in the former stage of a main rod electrode, and a voltage different from the voltage that is applied to the main rod electrode can be applied to the pre-rod electrode.

In the mass spectrometry unit 2, MS scan measurement, SIM measurement, MS/MS scan measurement, MRM measurement, and the like can be performed. In the MS scan measurement and the SIM measurement, only the latter-stage quadrupole mass filter (Q3) 234 functions as a mass filter without the former-stage quadrupole mass filter (Q1) 231 functioning as a mass filter (that is, with every ion allowed to pass). In the MS scan measurement, the mass-to-charge ratio of ions passing through the latter-stage quadrupole mass filter 234 is scanned. In the SIM measurement, the mass-to-charge ratio of ions passing through the latter-stage quadrupole mass filter 234 is fixed.

In the MS/MS scan measurement (product ion scan measurement) and the MRM measurement, both the former-stage quadrupole mass filter (Q1) 231 and the latter-stage quadrupole mass filter (Q3) 234 function as mass filters. In the former-stage quadrupole mass filter (Q1) 231, only ions set as precursor ions are allowed to pass. In addition, CID gas is supplied into the collision cell 232 and product ions are generated by the precursor ions being cleaved. In the MS/MS scan measurement, the mass-to-charge ratio of ions passing through the latter-stage quadrupole mass filter (Q3) 234 is scanned. In the MRM measurement, the mass-to-charge ratio of ions passing through the latter-stage quadrupole mass filter (Q3) 234 is fixed.

The control unit 4 has a storage unit 41 and is provided with a measurement data accumulation unit 42, a preceding-measurement-data determination unit 43, and a measurement execution unit 44 as functional blocks. In addition, the control unit 4 has a function to control an operation of each part such as the pump 11 and the injector 12 of the liquid chromatograph unit 1 and the power supply unit 24 and a CID gas supply unit (not illustrated) of the mass spectrometry unit 2 in accordance with an operation of each of the above-described parts. The control unit 4 is a personal computer in substance, and the function thereof as the control unit 4 is demonstrated by data processing software pre-installed in the computer being executed. An input unit 6 and a display unit 7 are connected to the control unit 4.

The procedure of analysis using the liquid chromatograph mass spectrometry device according to this example will be described below. In this example, MRM measurement is performed for quantification of a plurality of known target components contained in food samples.

Pre-stored in the storage unit 41 are measurement conditions used during sample measurement (measurement parameters respectively associated with the target components and switching times of the parameters). The measurement parameters include the type of column to be used, the type and flow velocity of the mobile phase, an MRM transition associated with each target component, and the value of collision energy (CE). The MRM transition is a combination of the mass-to-charge ratio of the precursor ions allowed to pass through the former-stage quadrupole mass filter (Q1) 231 and the mass-to-charge ratio of the product ions allowed to pass through the latter-stage quadrupole mass filter (Q3) 234 in the MRM measurement. The CE value is a voltage value to be applied during precursor ion cleaving in the collision cell 232.

An example of the measurement parameters is illustrated in FIG. 2($a$), and an example of the switching times of the measurement parameters is illustrated in FIG. 2($b$). In this example, the storage unit 41 stores three types of measurement conditions used for quantifying pesticides (Components A to F), which are known target components contained in food samples (category names: Food 1, Food 2, and Food 3). The measurement condition of the sample belonging to the classification of Food 1 (hereinafter, referred to as the "Food 1 measurement condition") is used in the MRM measurement to quantify Components A, B, C, and D. Set in this measurement condition are measurement parameters with which, for example, a sample is introduced into Column A along with Mobile Phase a having Specified Value 1 as the flow velocity thereof to separate Components A to D, and then measurement is performed on product ions with a mass-to-charge ratio of a1 generated by precursor ions with a mass-to-charge ratio of A1 being cleaved by a specified CE value.

Also stored as measurement conditions are specified values and formulas for the times (switching times) for switching the measurement parameters respectively corresponding to Components A to F. In the measurement condition of Food 1, for example, 3.0 min is set as the specified value of the switching time from the measurement parameter of Component A to the measurement parameter of Component B and the mathematical formula of ta+0.5(tb−ta) is stored as the switching time formula. Here, to is the retention time of Component A and tb is the retention time of Component B.

Figure 3A:
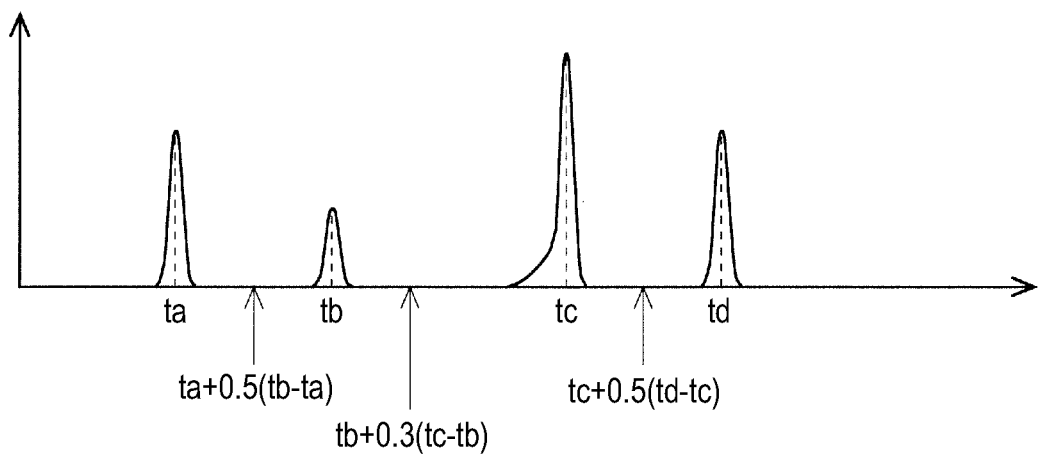
FIG. 3A is a mass chromatogram describing the switching time formula described in the measurement condition of Food 1.

The above formula will be described with reference to FIG. 3. FIG. 3A is a mass chromatogram describing the switching time formula described in the measurement condition of Food 1, FIG. 3B is a mass chromatogram describing the switching time formula described in the measurement condition of Food 2, and FIG. 3C is a mass chromatogram describing the switching time formula described in the measurement condition of Food 3.

In the example of FIG. 3A, the switching time from the measurement parameter of Component A (C) to the measurement parameter of Component B (D) is set at the time point that is in the middle between the retention times of these components. In contrast, the switching time from the measurement parameter of Component B to the measurement parameter of Component C is set close to the retention time of Component B. This is to allow for the tail of the peak of Component C extending with length to the Component B side as illustrated in FIG. 3A.

Figure 3B:
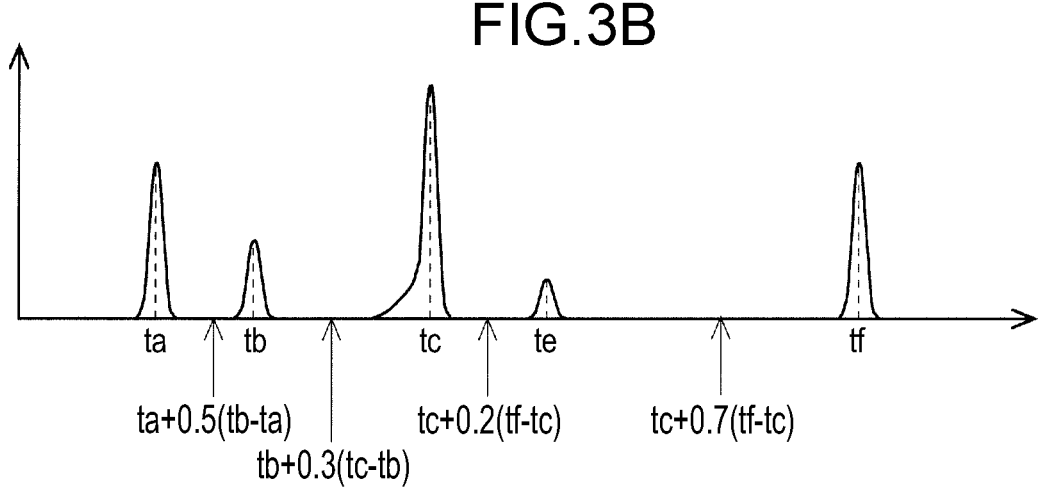
FIG. 3B is a mass chromatogram describing the switching time formula described in the measurement condition of Food 2.

Included in the example of FIG. 3B is the formula of tc+0.7(tf−tc) for determining the switching time from the retention times of two components that are not the retention times of two components eluted in succession from the column. This is to allow for Component E not being contained in the sample in many cases and the amount thereof being very small in many cases even if Component E is contained in the sample, and the switching time is determined from Component C and Component F, which are contained in quantity in the sample and facilitate accurate retention time determination.

Figure 3C:
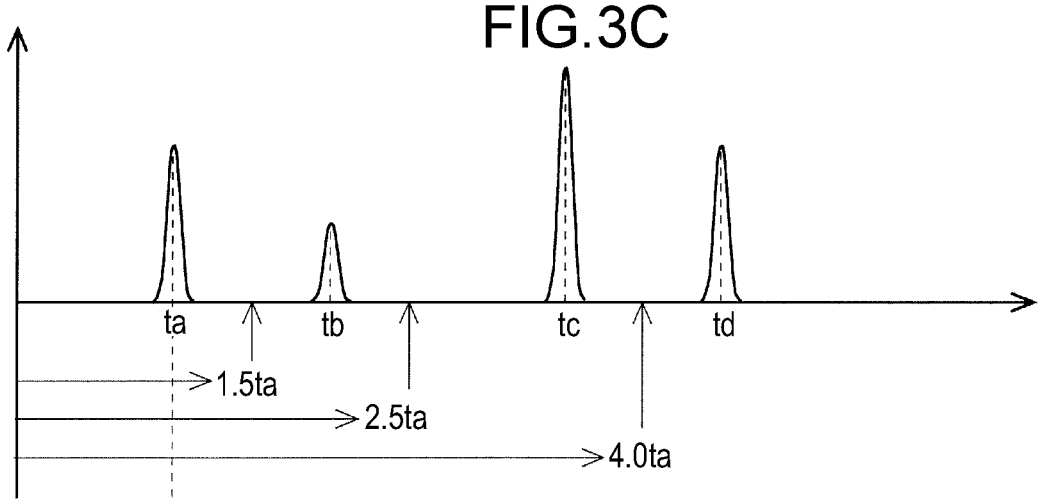
FIG. 3C is a mass chromatogram describing the switching time formula described in the measurement condition of Food 3.

In the example of FIG. 3C, every switching time is determined based only on the retention time of Component A. This case is advantageous in that every switching time can be determined from the retention time of a single component.

The flow of this measurement condition-based sample measurement will be described below.

Once a measurer selects one of the measurement conditions (Food 1 in this case) stored in the storage unit 41, the preceding-measurement-data determination unit 43 determines whether or not data (preceding measurement data) resulting from measurement of Components A to D with the column type, the mobile phase type, and the mobile phase flow velocity identical to those of Food 1 is stored in the measurement data accumulation unit 42. In other words, the preceding-measurement-data determination unit 43 determines whether or not data resulting from measurement of Components A to D based on the measurement condition of Food 1 or Food 3 is stored in the measurement data accumulation unit 42. The measurement condition of Food 2 is different in column type and mobile phase flow velocity. Accordingly, even if data resulting from measurement of Components A to D under this condition is stored in the measurement data accumulation unit 42, the data is not preceding measurement data.

Once the preceding-measurement-data determination unit 43 determines that the preceding measurement data is not stored in the measurement data accumulation unit 42, the measurement execution unit 44 performs sample measurement while switching the measurement parameter of Food 1 at the time point of the specified value of the switching time. Data obtained by this measurement is stored in the measurement data accumulation unit 42 along with the measurement parameter of Food 1.

Once the preceding-measurement-data determination unit 43 determines that the preceding measurement data is stored in the measurement data accumulation unit 42, the measurement execution unit 44 reads the preceding measurement data and determines the retention times of Components A to D from the data. If the measurement data accumulation unit 42 stores a plurality of pieces of the preceding measurement data, the latest one is selected therefrom. Then, a new switching time (updated switching time) is calculated by the retention times of Components A to D being applied to the respective switching time formulas included in the measurement condition of Food 1. Once the updated switching time is calculated, the measurement execution unit 44 performs sample measurement by switching the measurement parameter of Food 1 at the updated switching time. Data obtained by this measurement is stored in the measurement data accumulation unit 42 along with the measurement parameter of Food 1.

Depending on samples, the sample measurement using Food 1 may not completely include Components A to D. In a case where only Components A, B, and D are detected in the most recent preceding measurement data X and all of Components A to D are detected in preceding measurement data Y immediately preceding the most recent preceding measurement data X, for example, the retention times of Components A, B, and D are acquired from the preceding measurement data X and the retention time of Component C is acquired from the preceding measurement data Y.

As described above, in the liquid chromatograph mass spectrometry device according to this example, the storage unit stores not only measurement parameters for measuring a plurality of target components contained in samples and measurement conditions including switching times as timings for switching the measurement parameters of two target components eluted in succession from a column but also formulas for determining the switching times (updated switching times) by using as parameters predetermined retention times for one or a plurality of target components. At the time of sample measurement, it is determined whether there is preceding measurement data obtained by measurement of the same component in measurement sharing the same column type, mobile phase type, and mobile phase flow velocity as the measurement (typically, every measurement condition affecting the retention time being identical). If there is preceding measurement data, sample measurement is performed with the measurement parameter switching time updated from the formula and the most recent preceding measurement data. In determining the presence or absence of the preceding measurement data, the measurement parameters that do not affect the retention time, such as the MRM transition and the CE value, do not have to be identical.

In the related art, the measurement parameter switching time is determined in advance based on a standard sample measurement result and so on and no change in target component retention time is assumed. Accordingly, the related art is problematic in that target component measurement cannot be correct in the event of a change in target component retention time. In that case, standard sample measurement and retention time determination should be redone, and then actual sample measurement should be redone. In the liquid chromatograph mass spectrometry device according to this example, in contrast, the target component retention time is determined from the most recent preceding measurement data and the measurement parameter switching time is updated based thereon, and thus correct target component measurement can be carried out by means of an appropriate switching time reflecting the states of a column, a feed pump, and so on.

The above-described example is merely an example and can be appropriately changed in accordance with the spirit of the present invention. Although MRM measurement is performed in the configuration of the above-described example, the same configuration can be applied to SIM measurement as well. Although the above-described example is a liquid chromatograph mass spectrometry device, the same configuration can be applied to a gas chromatograph mass spectrometry device as well. The same configuration can also be applied to a chromatograph device using an absorbance detector or the like as a detector when a wavelength or the like is used as a measurement parameter. The same configuration can also be adopted when a plurality of known target components contained in samples are separated in terms of time and measured and flow path switching is performed based on the timing in a preparative chromatograph device.

The invention claimed is:

1. A chromatograph device separating and measuring a plurality of components contained in a sample in terms of time, the chromatograph device comprising:
   a) a storage section storing measurement parameters respectively associated with a plurality of target components assumed to be contained in a measurement target sample, measurement conditions including switching times as timings for switching the measurement parameters for each of two target components eluted in succession from a column, and formulas for determining the switching times using retention times for predetermined one or a plurality of target components among the plurality of target components;

b) a measurement data accumulation section accumulating data acquired by measurement using the chromatograph device along with information relating to a column type, a mobile phase type, and a mobile phase flow velocity in the measurement;

c) a preceding-measurement-data determination section determining, at the time of measurement target sample measurement, whether there is preceding measurement data in the measurement data accumulation section, the preceding measurement data being data obtained from measurement of the one or plurality of target components in measurement sharing the same column type, mobile phase type, and mobile phase flow velocity as the measurement; and d) a measurement execution section carrying out measurement of the measurement target sample on the basis of the measurement conditions if there is no preceding measurement data and, if there is preceding measurement data, determining the retention times of the one or plurality of target components on the basis of the most recent preceding measurement data, determining updated switching times as new switching times on the basis of the retention times and the formulas, and carrying out measurement of the measurement target sample with the switching times included in the measurement conditions changed to the updated switching times.

2. The chromatograph device according to claim 1, wherein the measurement parameters include a mass-to-charge ratio.

3. The chromatograph device according to claim 1, wherein the measurement parameters include a wavelength.

* * * * *